(12) United States Patent
Tang et al.

(10) Patent No.: US 10,112,291 B2
(45) Date of Patent: Oct. 30, 2018

(54) TIE ROD CONNECTION FOR A HYDRAULIC HAMMER

(71) Applicant: Caterpillar Inc., Peoria, IL (US)

(72) Inventors: Dennis Wai Man Tang, Hewitt, TX (US); Lauritz Pillers, Waco, TX (US)

(73) Assignee: Caterpillar Inc., Deerfield, IL (US)

( * ) Notice: Subject to any disclaimer, the term of this patent is extended or adjusted under 35 U.S.C. 154(b) by 389 days.

(21) Appl. No.: 15/001,331

(22) Filed: Jan. 20, 2016

(65) Prior Publication Data

US 2017/0203427 A1    Jul. 20, 2017

(51) Int. Cl.
*B25D 17/00*    (2006.01)
*F16B 13/06*    (2006.01)
*E02F 3/96*    (2006.01)

(52) U.S. Cl.
CPC .............. *B25D 17/00* (2013.01); *E02F 3/963* (2013.01); *E02F 3/966* (2013.01); *F16B 13/063* (2013.01); *B25D 2250/121* (2013.01); *B25D 2250/361* (2013.01)

(58) Field of Classification Search
CPC . F16B 39/12; B25D 9/04; B25D 17/00; E02F 3/966
USPC ......... 173/104, 109, 114, 115, 211, 210, 112
See application file for complete search history.

(56) References Cited

U.S. PATENT DOCUMENTS

| 2,610,504 | A | * | 9/1952 | Nigh ................... G01M 3/2846 |
| | | | | 73/12.08 |
| 3,013,323 | A | | 12/1961 | Williams |
| 4,018,291 | A | * | 4/1977 | Anderson ............. B25D 17/12 |
| | | | | 173/135 |
| 4,137,816 | A | | 2/1979 | Hilti Aktiengesellschaft |
| 4,162,859 | A | | 7/1979 | McAfee |
| 4,248,583 | A | | 2/1981 | Hedke et al. |
| 4,325,298 | A | | 4/1982 | Delmer |
| 4,898,505 | A | | 2/1990 | Froehlich |
| 6,000,477 | A | * | 12/1999 | Campling ................. E02D 7/10 |
| | | | | 173/100 |
| 6,386,564 | B1 | | 5/2002 | Kincad et al. |
| 6,540,449 | B1 | | 4/2003 | Bejerstal et al. |

FOREIGN PATENT DOCUMENTS

| EP | 0697530 B1 | 4/1998 |
| GB | 804152 A | 11/1958 |
| GB | 872996 A | 7/1961 |

* cited by examiner

*Primary Examiner* — Nathaniel Chukwurah
(74) *Attorney, Agent, or Firm* — Law Office of Kurt J. Fugman LLC

(57) ABSTRACT

A tie rod for use with a powered hammer assembly is provided that includes a body that defines a first end that is configured as a torque end, a second end that is configured as a fastening connecting end, and a longitudinal axis that extends from the first end to the second end, and a bearing surface that is positioned proximate the torque end along the longitudinal axis and that defines a tangent to the surface that forms an oblique angle with the longitudinal axis.

9 Claims, 3 Drawing Sheets

TIE ROD CONNECTION FOR A HYDRAULIC HAMMER

TECHNICAL FIELD

The present disclosure relates to hydraulic hammers such as those used by excavating machinery and the like. Specifically, the present disclosure relates to tie rods that hold the assemblies of hydraulic hammer units together using some sort of fastening connection.

BACKGROUND

Many conventional tie-rod designs for hydraulic hammers use a flat contact face requiring the machining of a sizable spot-face on the component being held. The precise flatness and perpendicularity of the spot-face of the spot face affects the integrity of the bolted joint. Angular misalignment of the tie rod may result if the spot face is not properly machined.

Conventional tie rod designs may be expensive to manufacture due to the much larger diameter of the torque end, and more particularly the flange. For example, a machined tie-rod requires a much larger diameter bar stock from which a large percentage of the material is removed attributing to higher cost. Also, the large spot face or flange requirement often show up as a difficult feature for 3D printing because the feature an over-hang requiring underlying support. The support material as well as the base must be removed after printing and in the case of metal parts, the support material must be machined away, adding cost.

U.S. Pat. No. 4,137,816 discloses an expansion dowel that is introduced into a borehole and that has a sleeve, an expanding body to be displaced into the sleeve for expanding it, a tie rod that is connected to the expanding body and an end support on the tie rod for applying torque to the dowel assembly. Torque is applied to the working surfaces on an end support of the dowel, that is, a bolt head or a nut, and the tie rod pulls the expanding body into the sleeve, spreading the sleeve into anchoring contact with the surface of the borehole. The expanding body may have a frusto-conically shaped surface that engages the sleeve and spreads the sleeve apart, creating a connection between the upper and lower ends of the expansion dowel. This connection relies solely on friction to maintain the holding power of the connection.

Accordingly, it is desirable to develop an improved tie bar connection for a hydraulic hammer and the like that is easier to manufacture and that provides a more robust connection than has been previously devised.

SUMMARY

A tie rod for use with a powered hammer assembly is provided that includes a body that defines a first end that is configured as a torque end, a second end that is configured as a fastening connecting end, and a longitudinal axis that extends from the first end to the second end, and a bearing surface that is positioned proximate the torque end along the longitudinal axis and that defines a tangent to the surface that forms an oblique angle with the longitudinal axis.

A powered hammer assembly is provided that includes a lower head that defines a plurality of tie rod bores, an upper head that defines a plurality of tie rod bores, wherein the bores of the lower head and the upper head define longitudinal axes. The assembly further includes a plurality of tie rods, wherein at least one tie rod comprises a torque end and a bearing surface positioned adjacent the torque end and the upper head defines at least one bearing surface that is partially complimentary shaped to the bearing surface of the tie rod for engagement therewith, wherein at least one of the bearing surfaces of either the upper head or the tie rod define a tangent to the surface that forms an oblique angle to the longitudinal axis of a bore. At least one of the bearing surfaces of the upper head or the tie rod may be axissymmetrical about the longitudinal axis of a bore.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
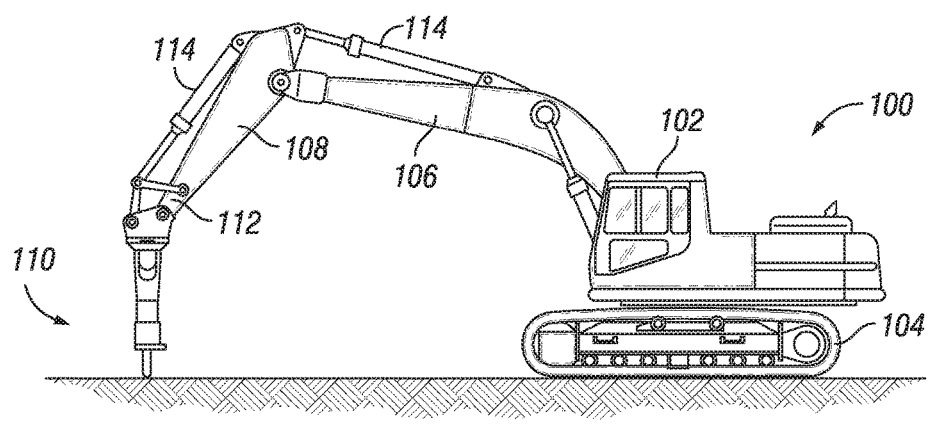
FIG. 1 is a front view of an excavating machine using a hydraulic hammer.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

While specific mention will be made to hydraulic hammer assemblies hereinafter, it is to be understood that any of the embodiments discussed herein may be used with any type of powered hammer assembly including those that are mechanically powered, electrically powered, etc.

Referring initially to FIG. 1, an excavating machine 100 of a type used for digging and removing rock and soil from a construction worksite is shown. The excavating machine 100 may incorporate a cab body 102 containing an operator station, an engine, and operating controls (not depicted). The machine 100 may be supported by, and may move on, tracks 104. An extensible boom 106 may be movably anchored to the cab body 102, and an articulating stick 108, also sometimes called a lift arm, may be secured to and supported for movement on the boom 106. The excavating machine 100 may incorporate a hydraulic hammer 110 as depicted, or may alternatively incorporate another implement, at an operational end 112 of the stick 108. Hydraulic cylinder actuators 114 may be utilized to move the stick 108 relative to the boom 106, and to move the hydraulic hammer 110 relative to the stick 108.

Figure 2:
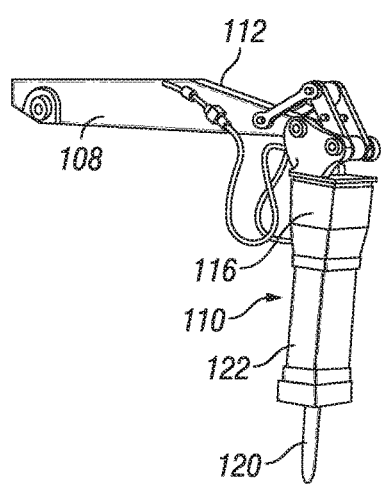
FIG. 2 is a perspective view of the hydraulic hammer and part of the stick of the machine of FIG. 1 shown in isolation from the machine.

Referring now also to FIG. 2, the hydraulic hammer assembly 110 may be secured to the operational end 112 of the stick 108. The hydraulic hammer assembly 110 may include an upper portion 116 that includes a power cell 118 shown below in FIG. 3 and a lower so-called front head portion 122 secured to the power cell 118. A hammer tool 120 having an upper end (not shown) may be retained within the front head portion 122. The hammer tool 120 may be adapted to produce cyclic vibrational movement at an intensity sufficient to demolish rocks, for example. The functional parts of the hydraulic hammer assembly 110, including the hammer tool 120 may be constructed of a forged or otherwise hardened metal such as a refined steel, for example, to assure appropriate strength, although other suitable materials such as diamond bits for operative portions of the hammer tool 120, for example, may be utilized within the scope of this disclosure.

Figure 3:
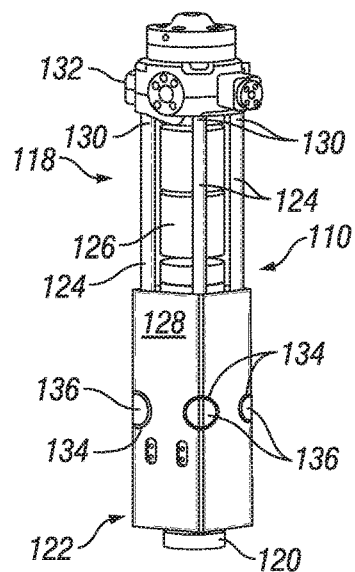
FIG. 3 is a perspective view of the hydraulic hammer assembly of FIG. 2 with part of the exterior housing removed, showing more clearly the tie rods that hold the assembly together.

Referring now also to FIG. 3, the hydraulic hammer assembly 110 is shown alone, i.e. detached from the stick 108 and with its exterior case covers removed, to reveal an exposed power cell 118, and a plurality of tie rods 124 circumferentially disposed about a cylindrical piston-containing sleeve structure 126. The sleeve structure 126 may contain a piston (not shown) adapted to drive the hammer tool 120. As such, the power cell 118 may be effective to utilize a suitable working fluid, such as a hydraulic and/or pneumatic fluid, for example, to reciprocally impact the piston against the upper end (not shown) of the hammer tool 120. It may also be appreciated that the plurality of tie rods 124 may be effective to retain or hold the power cell 118 and the front head portion 122 together under harsh impact loads as may be experienced within the hydraulic hammer assembly 110.

The lower front head portion 122 may define an actual front head 128, which may function as a structural housing to support the upper end (not shown) of the hammer tool 120 (shown only fragmentarily in FIG. 3). An upper end 130 of each of the tie rods 124 may be secured to an upper structure or upper head 132 of the power cell 118. Each tie rod 124 may have a threaded lower end (not depicted) that extends downwardly through a vertically oriented aperture or tie rod bore 134 within the front head 122. The tie rod bore 134 defines a longitudinal axis of the installed tie rod 124. Each tie rod 124 may be adapted to be threadedly secured to a tie rod nut 136.

Figure 4:
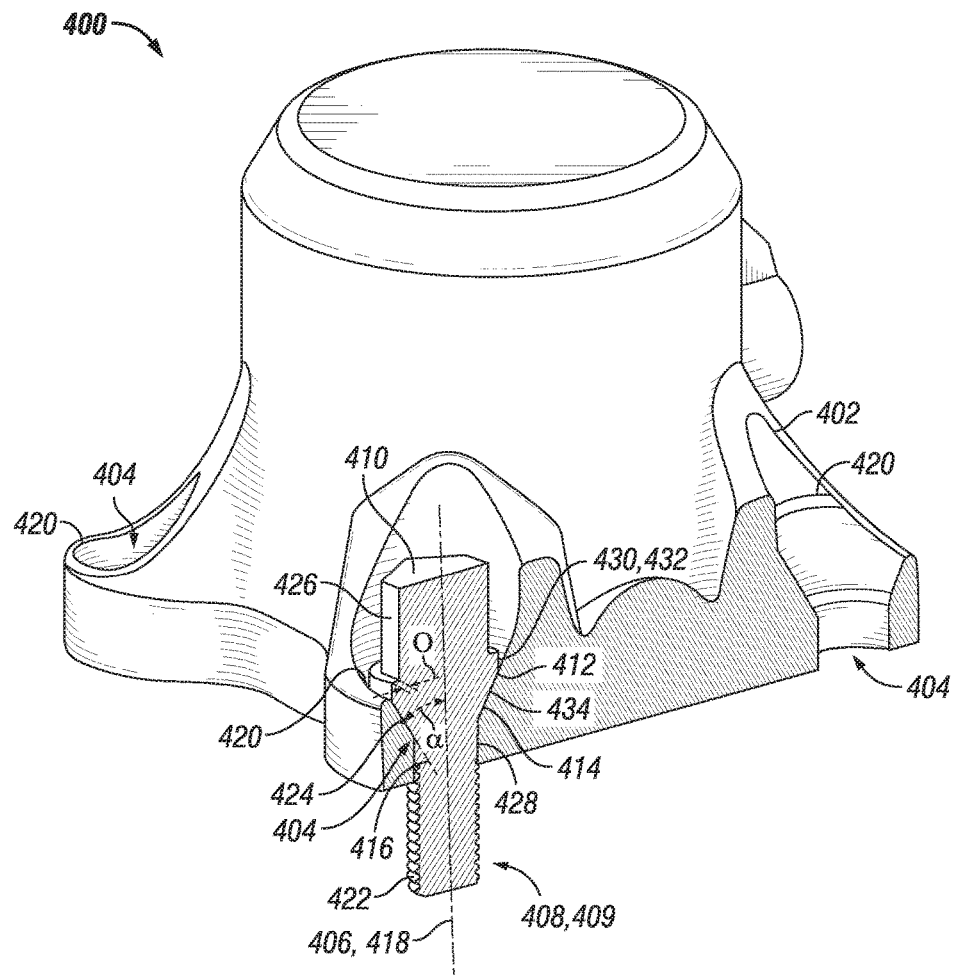
FIG. 4 is a perspective view of a head of a hydraulic cylinder with a portion of it cut away, revealing an improved tie rod connection according to an embodiment of the present disclosure.

Looking now at FIG. 4, an example of an improved tie rod connection for a hydraulic assembly 400 is illustrated. The hydraulic hammer assembly 400 comprises a lower head that defines a plurality of tie rod bores (not shown in FIG. 4 but is to be understood to be present referring back to FIG. 3) and an upper head 402 that defines a plurality of tie rod bores 404. Each of the bores of the lower head and the upper head define longitudinal axes 406, 418. A pair of bores, one each from the lower head and upper head 402 align such that their longitudinal axes 406, 418 are coextensive. These bores are located on each corner of the upper head 402 and lower head. Only three such bores 404 are shown in FIG. 4, knowing that the fourth bore is present opposite the depiction of the bore 404 and associated tie rod 408 shown in the forefront. A power cell 118 that includes hydraulic mechanisms for moving the work tool up and down is located within the assembly 400 (not shown here but is to understood to be present referring back to FIG. 3).

A plurality of tie rods 408 are provided although only one is shown here in FIG. 4 for the sake of simplicity. At least one tie rod 408 comprises a torque end 410 and a bearing surface 414 positioned adjacent the torque end 410. The upper head 402 defines at least one bearing surface 412 that is at least partially complimentary shaped to the bearing surface 414 of the tie rod 408 for engagement therewith. As shown both bearing surfaces 412, 414 are completely complimentary shaped to each other and define a tangent 416 that forms an oblique angle to the longitudinal axis 406 of the bore 404 and the longitudinal axis 418 of the tie rod 408, which are essentially coextensive with each other for this embodiment. Because the surfaces 412, 414 are conically shaped, their tangents 416 are coextensive with the surfaces 412, 414 themselves. This may not be the case when other surfaces such as radial, spherical or other axis-symmetrical surfaces are used.

In some embodiments, at least one of the bearing surfaces 412, 414 of either the upper head 402 or the tie rod 408 define a tangent 416 to the surface 412, 414 that forms an oblique angle $\alpha$ to the longitudinal axis 406 of a bore and at least one of the bearing surfaces 412, 414 of the upper head 402 or the tie rod 408 is axis-symmetrical about the longitudinal axis 406 of a bore 404 while the other may not. For example, the perimeter 420 of the bore 404 may have a square shape that is proximate angled surfaces that are tangent to the conical surface of the tie rod 408 or vice versa.

For this embodiment, both the bearing surfaces 412, 414 of the upper head 402 and the tie rod 408 form an oblique angle $\alpha$ with the longitudinal axis of the bore 404 and are axis-symmetrical about the longitudinal axis 406.

For the embodiment shown in FIG. 4, it is contemplated that every tie rod 408 is similarly configured and every bore 404 of the upper head 402 is positioned adjacent a bearing surface 412 that is complimentary shaped to engage the corresponding bearing surface 414 of the tie rod 408. Specifically, the bearing surface 412 extends from the perimeter 420 of the bore 404 along the longitudinal axis 406 of the bore 404.

The upper end of the tie rod 408 is configured to act as the torque end 410 and includes a standardized hexagonal shape that fits with a standardized wrench configuration. Other shapes such as allen wrench shapes, torx wrench shapes, etc. could also be used.

Figure 5:
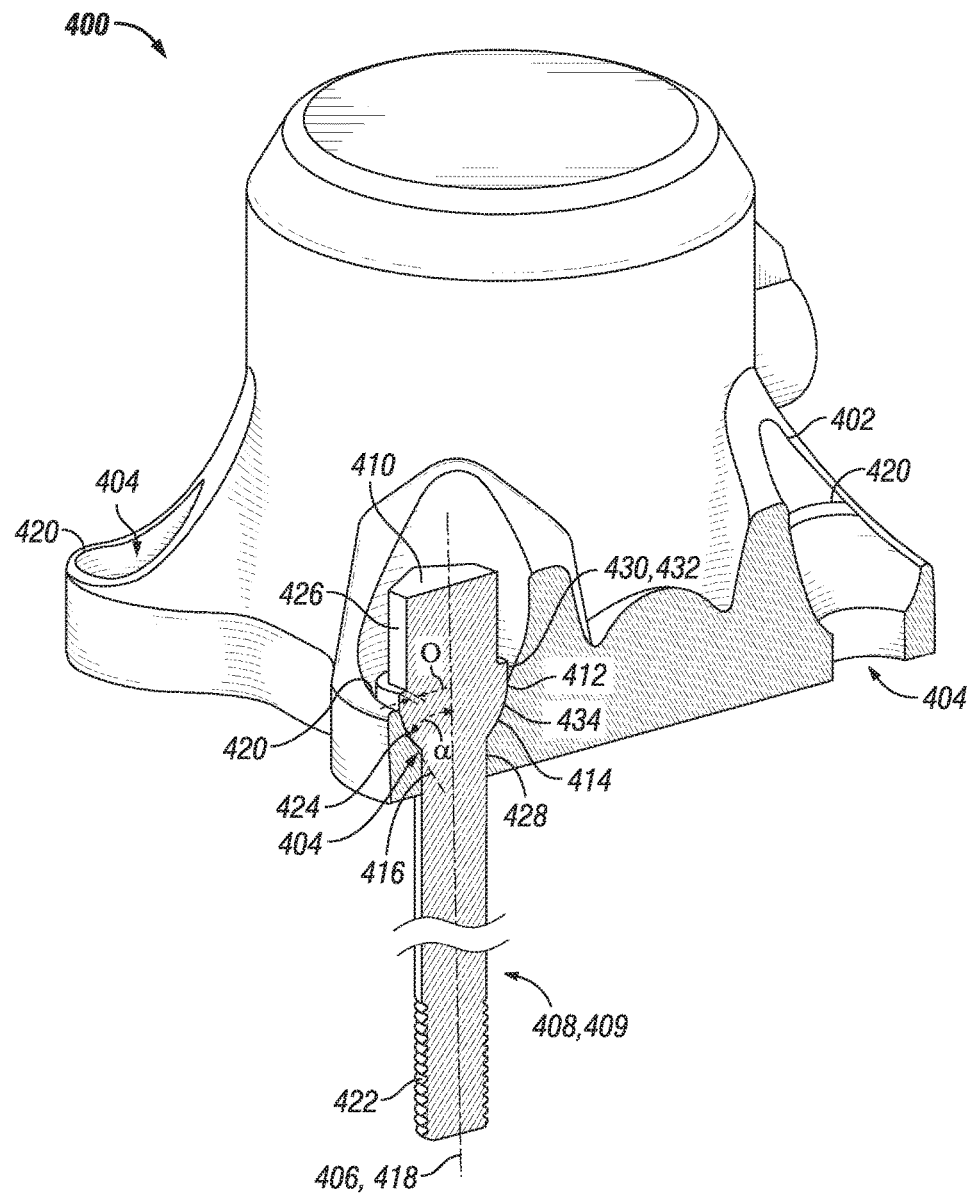
FIG. 5 is a perspective view of a tie rod according to a second embodiment of the present disclosure.

FIGS. 4 and 5 show the tie rod 408 having a truncated length along the longitudinal axis 418 for the ease of illustration. It is to be understood that it could be much longer. The tie rod 408 further defines a second end 422 that is opposite the torque end 410 and a longitudinal axis 418 that extends between the torque end 410 and the second end 422. The second end 422 may comprise a fastening connection 422 such as threads or a clip ring groove, etc. as desired. The tie rod 408 further comprises a shank portion 428 positioned between the torque end 410 and the second end 422 along the longitudinal axis 418. As shown, the shank portion 428 is shorter than the threaded portion 422 along the longitudinal direction 418, but in other embodiments, the shank portion 428 is longer than the second threaded end 422 along the longitudinal axis 418.

Focusing now on FIGS. 4 and 5, two embodiments of a tie rod 408 of the present disclosure are disclosed. The tie rods 408 include a body 409 that defines a first end 410 that is configured as a torque end 410, a second end 422 that is configured as a fastening connecting end 422, and a longitudinal axis 418 that extends from the first end 410 to the second end 422, and a bearing surface 414 that is positioned proximate the torque end 410 along the longitudinal axis 418 and that defines a tangent 416 to the surface that forms an oblique angle α with the longitudinal axis 418. The angle α taken at a midpoint 424 of the bearing surface 414 along the longitudinal axis 418 is approximately 30 degrees. However, this may vary depending on the application.

The torque end 410 may comprise a faceted perimeter 426. This may be defined by a protrusion as shown in FIGS. 4 and 5 or a recess. The bearing surface 414 is positioned between the first end that is configured as a torque end 410 and the second end 422 that is configured as a fastening connecting end 422 along the longitudinal axis 418. In some embodiments, the faceted surface 426 of the torque end 410 may be located lower than the bearing surface 414 such as in a recess.

In FIGS. 4 and 5, the bearing surface 414 is a conical and spherical surface respectively, and they are axis-symmetrical about the longitudinal axis 418. A shank portion 428 is positioned between the first and second ends 410, 422 along the longitudinal axis 418. A flange portion 430 is positioned immediately between the torque end 410 and the bearing surface 414 along the longitudinal axis 418. The bearing surface 414 defines a perimeter proximate the flange 430 and the flange 430 defines a side surface 432 that extends from the perimeter 434 of the bearing surface 414 along the longitudinal axis 418. This spacial relationship may vary in other embodiments. The torque end 410 defines a polygonal perimeter 426 that is offset O from the side surface 432 of the flange 430 toward the longitudinal axis 418.

INDUSTRIAL APPLICABILITY

In some embodiments of the present disclosure, using a conical, spherical, or other axis-symmetric shape for the torque end means that a flat spot-face is no longer required on the held component. Also, the conical seat reduces the cost of machining by reducing the diameter of the bar stock required. In still other embodiments, an improvement of the bolted joint is provided by eliminating lateral and angular misalignment as well as providing a better contact surface. Furthermore, a conical or spherical surface can also be designed to be self-supporting in a 3D print configuration, eliminating the need for building support structures and its subsequent removal.

For this embodiment, the bearing surface is made integral with the body of the tie rod itself, however, it is contemplated that the bearing surface could be incorporated into a separate nut member that surrounds the shaft of the tie rod in other embodiments. In embodiments where the tie rod has an integral flange for pushing down on the nut member that includes the bearing surface, the internal hole of the nut may lack any threads and may ride on a smooth portion of the shaft of the tie rod. In other embodiments, the internal hole of the nut member may be internally threaded for engaging external threads disposed on the shaft of the tie rod.

Using the embodiments of the apparatus as discussed, rotating the tie rod causes the threaded end to tighten on a nut, pulling the tie rod downward until its bearing surface contacts the bearing surface of the upper head. Since these surfaces are configured to provide a lead-in, proper alignment of the tie rod occurs and better contact is achieved.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A powered hammer assembly comprising:
a lower head that defines a plurality of tie rod bores;
an upper head that defines a plurality of tie rod bores, wherein the bores of the lower head and the upper head define longitudinal axes;
a power cell; and
a plurality of tie rods, wherein at least one tie rod comprises a torque end and a bearing surface positioned adjacent the torque end and the upper head defines at least one bearing surface that is at least partially complimentary shaped to the bearing surface of the tire rod for engagement therewith, wherein at least one of the bearing surfaces of either the upper head or the tie rod define a tangent to the surface that forms an oblique angle to the longitudinal axis of a bore and at least one of the bearing surfaces of the upper head or the tie rod is axis-symmetrical about the longitudinal axis of a bore.

2. The powered hammer assembly of claim 1 wherein both the bearing surfaces of the upper head and the tie rod form an oblique angle with the longitudinal axis of a bore and are axis-symmetrical about the longitudinal axis.

3. The powered hammer assembly of claim 2 wherein every tie rod is similarly configured and every bore of the upper head is positioned adjacent a bearing surface that is complimentary shaped to engage the corresponding bearing surface of the tie rod.

4. The powered hammer assembly of claim 2 wherein the bearing surfaces are all conically shaped.

5. The powered hammer assembly of claim 1 wherein the torque end of the tie rod includes a standardized hexagonal shape.

6. The powered hammer assembly of claim 1 wherein the tie rod further defines a second end that is opposite the torque end and a longitudinal axis that extends between the torque end and the second end.

7. The powered hammer assembly of claim 6 wherein the second end comprises threads.

8. The powered hammer assembly of claim 7 wherein the tie rod further comprises a shank portion positioned between the torque end and the second end along the longitudinal axis.

9. The powered hammer assembly of claim 8 wherein the shank portion is longer than the second threaded end along the longitudinal axis.

* * * * *